Nov. 27, 1951 F. O. HESS ET AL 2,576,342
APPARATUS FOR HEATING SELECTED PORTIONS OF ELONGATED
WORKPIECES IN A CONTINUOUS PROCESS
Filed Feb. 13, 1947 4 Sheets-Sheet 4
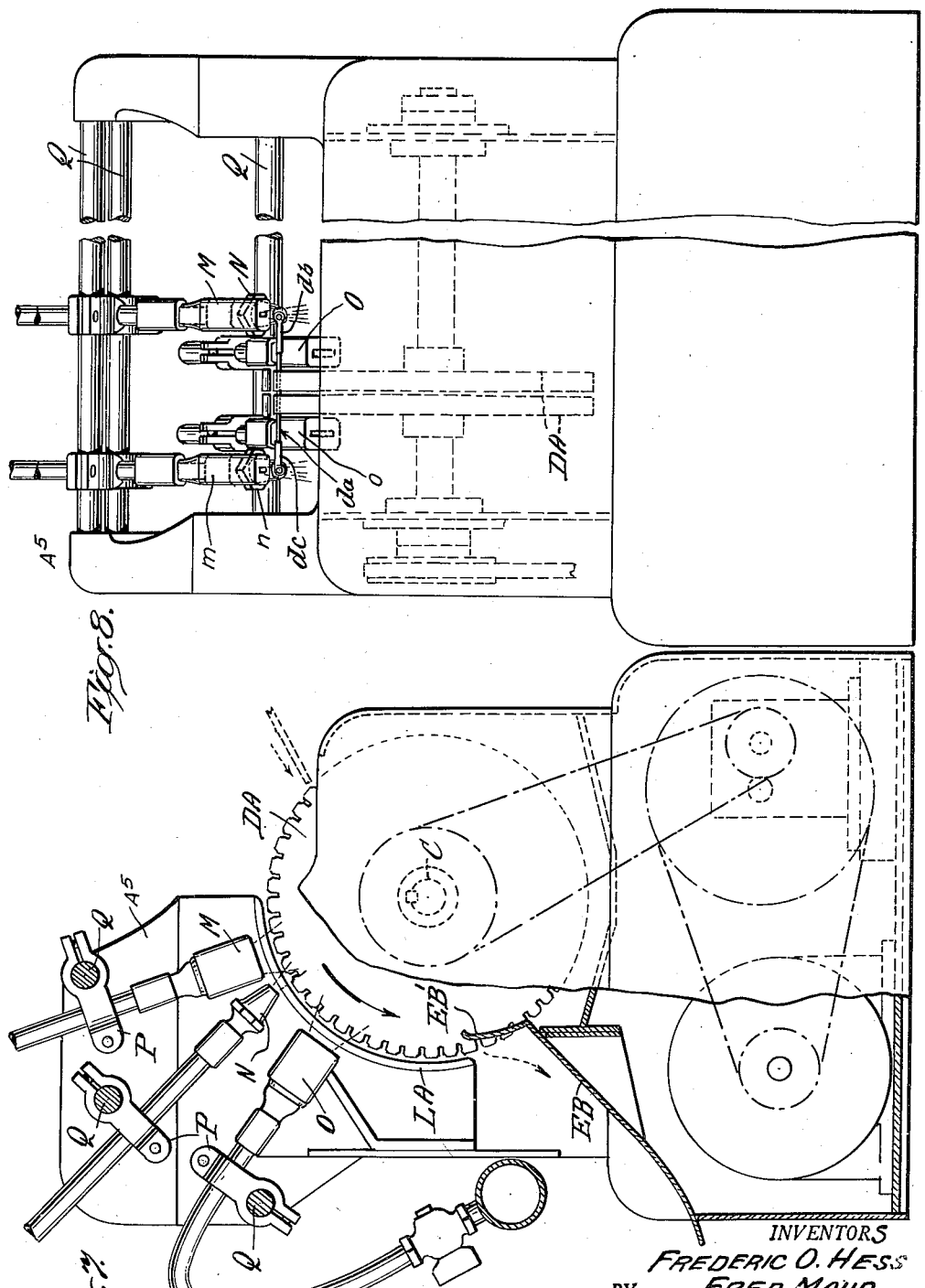
INVENTORS
FREDERIC O. HESS
FRED MAUD
BY
John E. Hubbell
ATTORNEY Patented Nov. 27, 1951

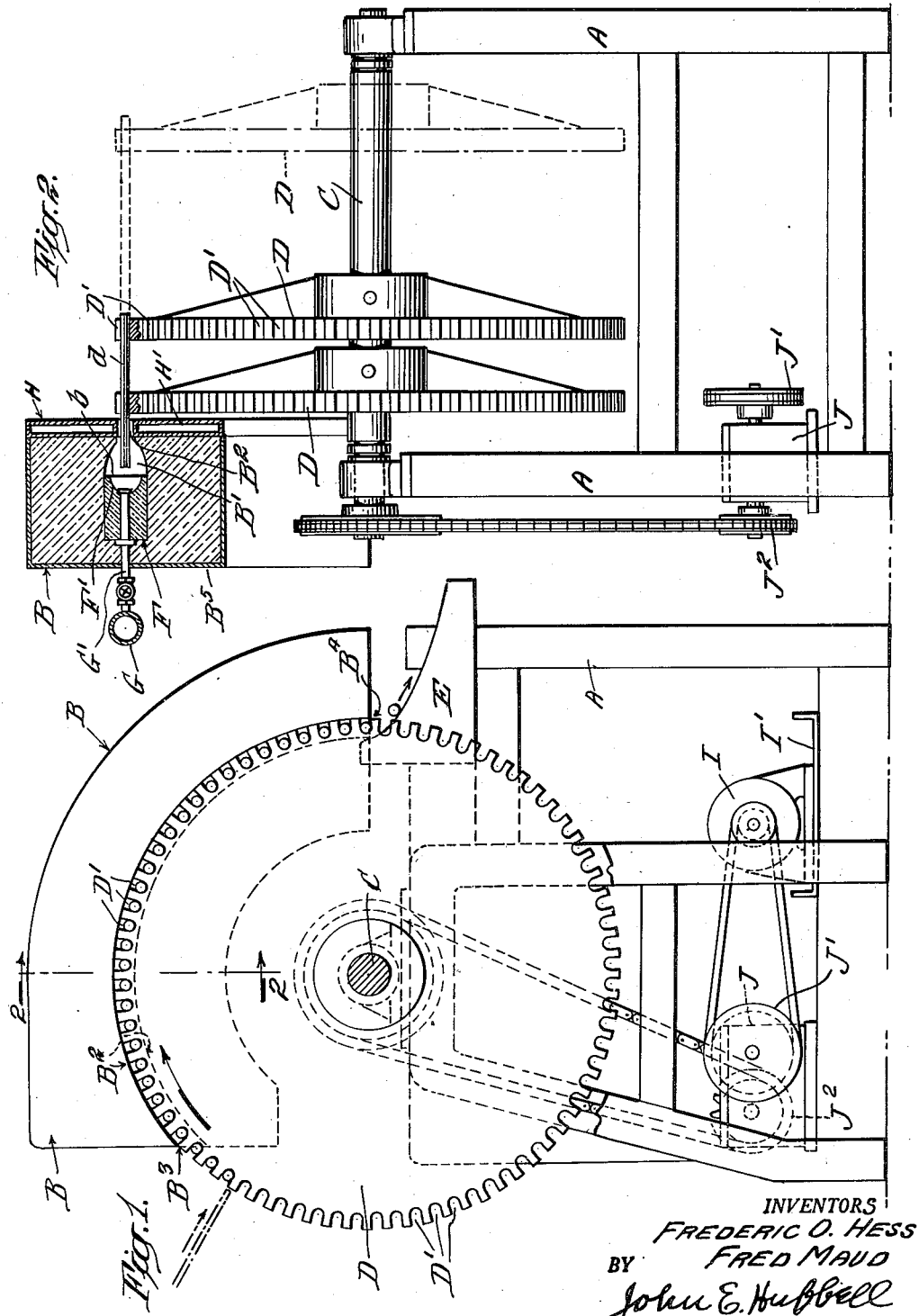

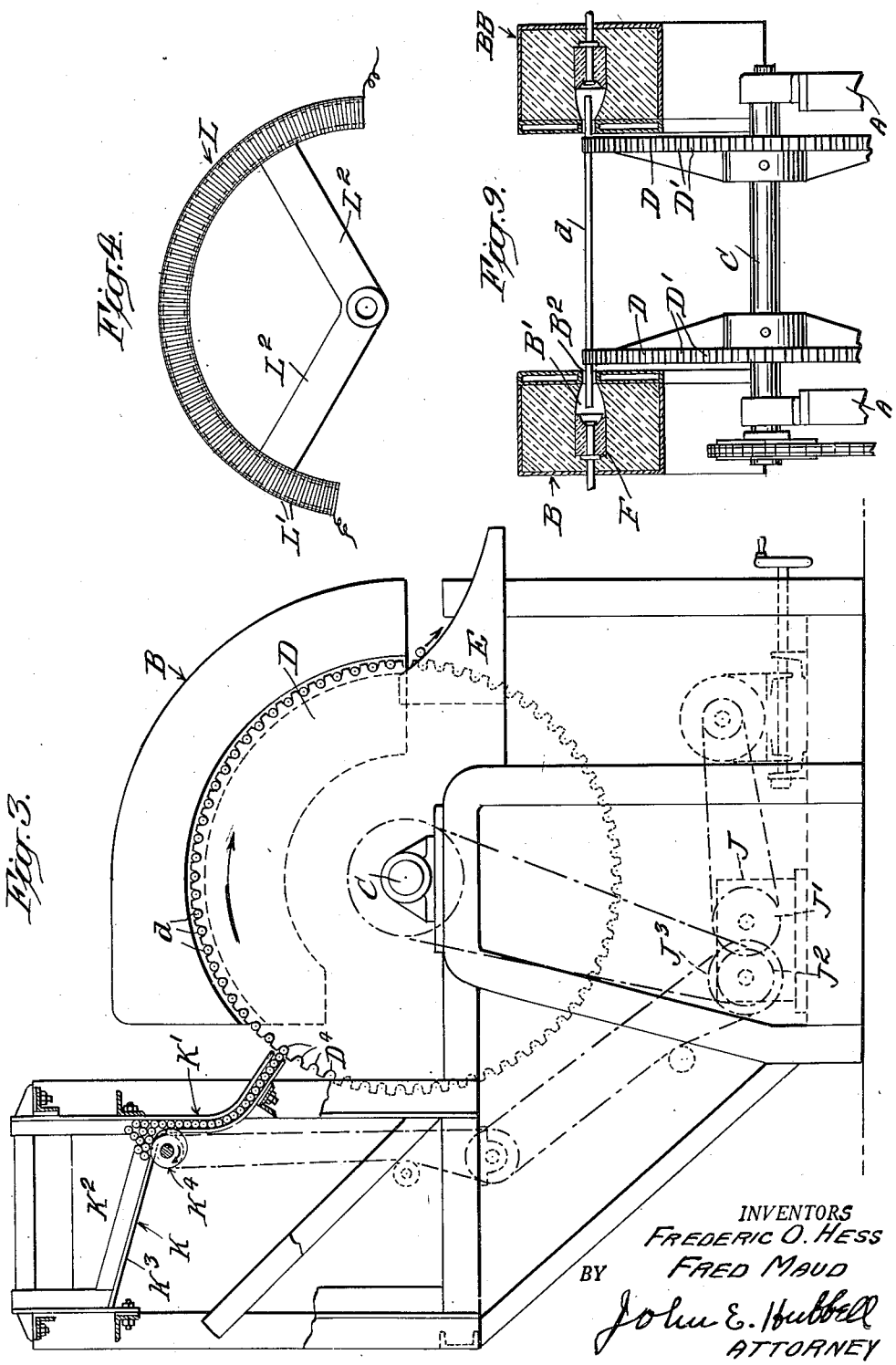

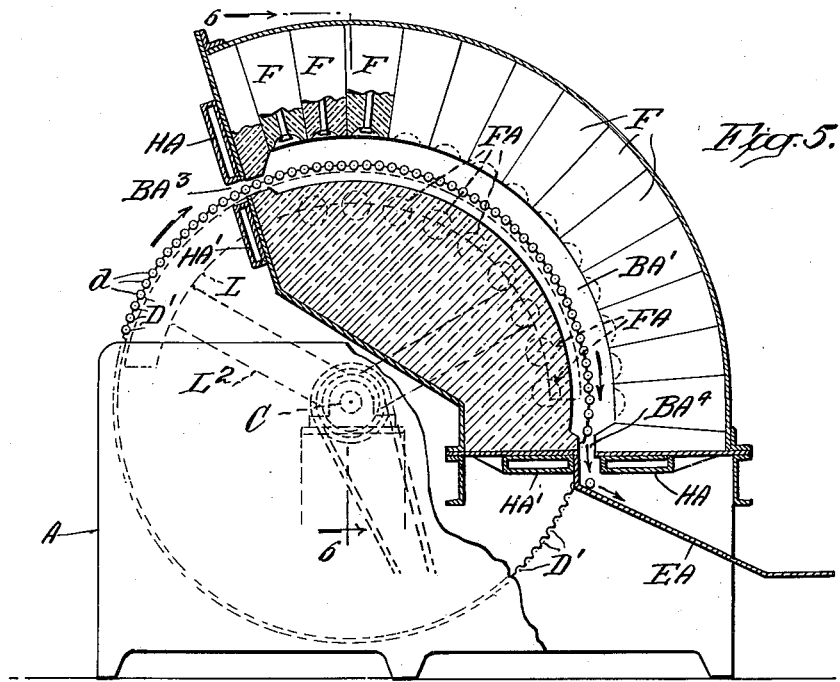
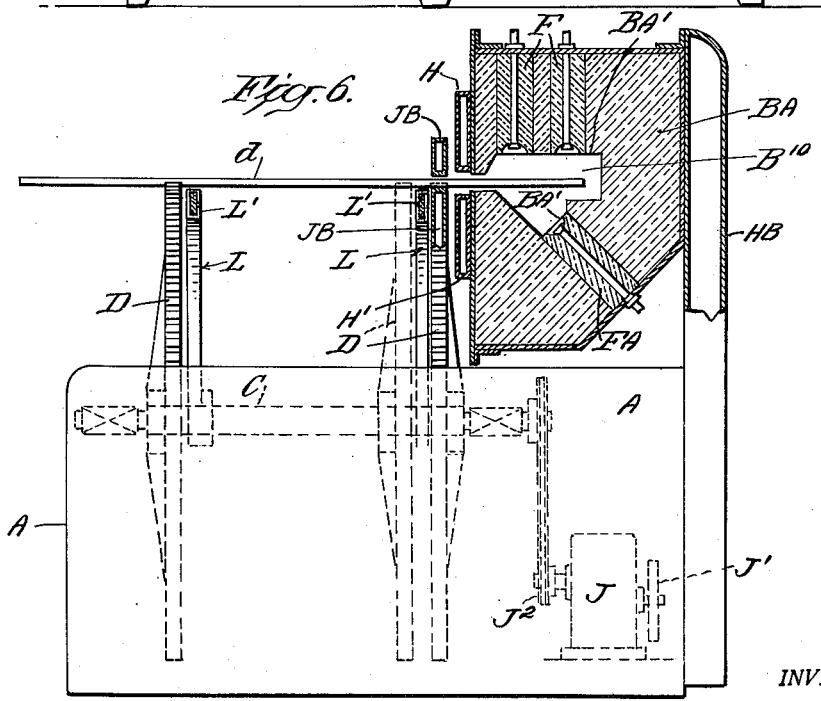

2,576,342

UNITED STATES PATENT OFFICE 2,576,342

APPARATUS FOR HEATING SELECTED PORTIONS OF ELONGATED WORKPIECES IN A CONTINUOUS PROCESS

Frederic O. Hess and Fred Maud, Philadelphia, Pa., assignors to Selas Corporation of America, Philadelphia, Pa., a corporation of Pennsylvania Application February 13, 1947, Serial No. 728,320

6 Claims. (Cl. 263—6)

The present invention relates to heat treating apparatus, and the primary object of the invention is to provide improved means for heating some, without heating other longitudinal portions of metallic rods and other elongated metallic articles. A more specific object of the invention is to provide simple and effective apparatus for rapidly and uniformly heating the ends of rods or analogous elongated work pieces as they are successively moved along an arcuate heating path between loading and unloading stations by a work supporting structure rotating about a horizontal axis.

In the preferred form of the invention, the rotating work carrier comprises a pair of notched wheel or dial members mounted on the same shaft, and preferably relatively adjustable longitudinally of the shaft to adapt the work holder for use in holding work pieces of different lengths. Each such wheel or dial element is formed with peripheral notches, each of which is in register with a corresponding notch in the other wheel or dial element and cooperates with the latter to form an individual work support in which a work piece may be placed.

A specific object of the invention is to combine with the rotating work carrier, simple and effective means for automatically placing a work piece in each aligned pair of notches as the latter move through a loading station.

Another specific object of the invention is to combine with the rotating work carrier, simple and effective magnetic means operative to hold each work piece in the notches at the peripheries of the wheel or dial elements during a portion, at least, of the movement of the work piece from the loading to the unloading station.

In one form of the invention, each rod end to be heated extends into an arc shaped gas fired furnace chamber through a slot in the side wall of the chamber adjacent the rotating work carrier. In another form of the invention, portions of the work pieces are heated as they move past gas burners stationed along the paths of movement of the portions so heated. The form of the invention last referred to is adapted for use in hardening and tempering ferrous work pieces, and quenching devices may be arranged in suitable relation to the burner as required for the desired tempering operation.

The various features of novelty which characterize the invention are pointed out with particularity in the claims annexed to and forming a part of this specification. For a better understanding of the invention, however, its advantages, and specific objects attained with its use, reference should be had to the accompanying drawing and descriptive matter in which we have illustrated and described preferred embodiments of the invention.

Of the drawings:

Fig. 1 is a side elevation of heat treating apparatus, with parts broken away and shown in section;

Fig. 2 is an elevation taken at right angles to Fig. 1 and partly in section on the line 2—2 of Fig. 1;

Fig. 3 is an elevation taken similarly to Fig. 1, illustrating the combination with the apparatus shown in Fig. 1, of means for automatically feeding work pieces to the work carrier;

Fig. 4 illustrates an electromagnetic element which may be used to hold work pieces in the work carrier;

Fig. 5 is an elevation with parts broken away and in section, illustrating heat treating apparatus differing somewhat from that shown in Figs. 1–3;

Fig. 6 is an elevation taken at right angles to Fig. 5 and partly in section on the line 6—6 of Fig. 5;

Fig. 7 is an elevation of hardening and annealing apparatus, differing somewhat from apparatus shown in Figs. 1–6;

Fig. 8 is an elevation taken at right angles to Fig. 7; and

Fig. 9 is a somewhat diagrammatic elevation of another form of apparatus.

In the drawings and referring first to the construction shown in Figs. 1 and 2, A illustrates a supporting framework for an arc shaped heating furnace B, and for an associated work carrier. The latter comprises a rotatable horizontal shaft C and one or more wheel or dial members D mounted on and rotating with said shaft. Usually and as shown, the work carrier includes two such wheel or dial members D. Each wheel or dial member is notched at its periphery to provide work receiving seats D' suitably distributed about the shaft C. Each notch in one member D is in axial alignment with a notch in the other member, and each pair of registering notches collectively provide a support for an elongated work piece $d$ which may be, and as shown is, a rod or bar of ferrous material. In the normal operation of the apparatus shown in Figs. 1 and 2, during a portion of the time in which it is mounted in the work support, each work piece $d$ extends through an arc shaped slot $B^2$ in the adjacent side wall of an arc shaped furnace chamber $B'$ formed in the furnace B. The inserted end portion of each work piece $d$ has an end portion within an arc shaped furnace chamber B' in the furnace B, and an intermediate adjacent portion within an arc shaped slot B² in the side wall of the furnace chamber. Said end portion of the work piece d enters the chamber B' through its open end B³ and leaves through its second end B⁴, travelling through the chamber in the direction of the arrow shown in Fig. 1.

As shown in Fig. 1, the heating chamber B' extends circularly about the axis of the shaft C through an angle which is substantially greater than 90°. The discharge end B⁴ of the furnace chamber is at or about the level of the axis of the shaft C, and as each work piece moves down from the last mentioned level, the work pieces fall or roll out of the work receiving notches D' on to guide surfaces formed by the upper edge of a chute member E which is inclined downwardly and laterally away from the axis of the shaft C. As shown in Fig. 1, the member E has an upper end portion within the space between the dials D which is shaped and disposed to positively cam each work piece out of the work holding notches in the dials, if the work piece does not move out of said notches under the action of gravity prior to its engagement with the member E. To accommodate work pieces of different lengths, the dial relatively remote from the furnace chamber B is adapted to be adjusted axially along the shaft C between its positions shown in full and dotted lines in Fig. 2 and to be secured to the shaft C in either of said positions or in an intermediate position, as the work piece length may make desirable.

In the form shown in Fig. 2, the furnace chamber B has its back wall B⁵ facing the slot B² in a vertical plane, and has its inner and outer walls each incurved toward the other so that the radial extent of the portion of the chamber adjacent the slot B² is about equal to that of the slot and is much greater adjacent the back wall. The furnace chamber B' may be widely varied in form. The form shown in Fig. 2 is well adapted for use with the particular form of furnace heating system shown in Figs. 1 and 2. That heating system comprises a row of furnace wall burners F with their axes parallel to the shaft C and each including a combustion chamber in the form of a shallow cup shaped depression F' in the furnace chamber back wall b.

The burners F may well be, and as shown are of the widely known and used type disclosed in Hess Patent No. 2,215,079 of September 17, 1940. A burner of that type is characterized by the introduction of a combustible mixture of air and gas to the bottom portion of the combustion chamber of the burner in a multiplicity of fine streams diverging from the axis of the combustion chamber and directed so that combustion is effected within the combustion chamber and adjacent the curved wall of said chamber. The wall of the combustion chamber is formed of refractory material adapted to withstand high temperatures, and in regular operation the combustion chamber wall is highly heated so that a relatively large amount of the heat liberated is radiated to the work from the combustion chamber wall. Combustible mixtures may be supplied to each of the burners F through an individual branch pipe G' receiving combustible mixture from an external manifold pipe G alongside the furnace chamber.

The furnace structure B may be formed in accordance with the customary practice of the art, of ceramic material encased in sheet metal and supported by a suitably shaped metallic framework. The ceramic material of which the body portion of the furnace structure is formed, may vary in different portions of the furnace structure in accordance with the temperatures in said portions.

The furnace structure may include fluid cooling elements located as conditions make desirable. Thus, as shown in Figs. 1 and 2, the side of the furnace structure in which the slot B² is formed, comprises inner and outer arc shaped hollow metallic walls H and H' with their adjacent edges separated by a space of substantially the same radial extent as the slot B². The hollow walls H and H' may be provided with inlets and outlets for the admission and discharge of a fluid coolant, which ordinarily is water. Inasmuch as the fluid cooled walls are not claimed as novel herein, provisions for passing a coolant into and discharging a coolant from those walls, are not shown. Other fluid cooling elements may be provided in some cases, as is shown in Figs. 5 and 6.

As shown in Figs. 1 and 2, the shaft C is rotated at suitable speed by a motor I through a suitable driving connection. The latter, as shown, comprises a speed reducing device J of conventional form including an input pulley J' which is belt connected to the armature shaft of the motor I, and including an output pulley J² belt connected to the shaft C. Provisions I' may be made for the adjustment of the motor I toward and away from the speed reducing element J, as required to maintain the belt connecting the armature shaft to the pulley J' under proper tension.

In operation, the work pieces d are placed in the up moving work carrier notches D' at a loading station which may be located at any convenient level between the entrance end B³ of the chamber B and the level of the shaft C. The work pieces may be put in place in the work carrier manually, or by means of an automatic feeder mechanism such as that shown in Fig. 3. The work feeder K, shown in Fig. 3, automatically moves work pieces one at a time into the work support notches D⁴ as the latter move past the discharge end of a chute K' leading down to the loading station from the bin or hopper portion K² of the feeder. As shown, the chute K' is of a thickness only slightly greater than the work piece diameter so that it holds a single row of work pieces. The bin K² has a bottom wall K³ downwardly inclined toward the upper end of the chute K'. As shown, a rotating cam type feeder element has cam wheel portions K⁴ which, in effect, form a portion of the bottom wall of the bin immediately adjacent the upper end of the chute K' and operate to prevent the work pieces from jamming at the entrance to the chute K'. As shown somewhat diagrammatically in Fig. 3, the rotating feeder element K⁴ is rotated through belt connections from a pulley J³ forming a part of the speed reducing element J.

Figs. 5 and 6 illustrate a modification of the apparatus shown in Figs. 1 and 2, particularly adapted for use when there is need for a greater furnace heating effect than can readily be obtained with the furnace shown in Figs. 1 and 2, as when the portion of the work piece within the heating chamber is substantially greater than it is in Figs. 1 and 2. As shown in Fig. 6, a portion of the work piece d extending into the furnace chamber B¹⁰ of the arc shaped furnace structure BA is long enough to make it desirable to use two rows of furnace wall burners F at the outer or convex side BA' of the furnace chamber, and a third row of burners FA at the concave side of the furnace chamber. The burners F and FA may each be of the same type as the burners F of Figs. 1 and 2. The axis of each of the burners F of Figs. 5 and 6 is substantially radial to the axis of the shaft C. In the preferred construction shown in Figs. 5 and 6, each of the burners F forms part of a wedge shaped ceramic structural unit having radially opposed sides. In consequence, the burner units F in each row extending longitudinally of the combustion chamber $B^{10}$, to unite to form a masonry arch with the joints between adjacent units in the row substantially at right angles to the length of the adjacent portion of the combustion chamber.

The burners FA are so arranged that the axis of each burner is located in a plane which is substantially radial to the axis of the shaft C, and, as shown, each burner is inclined at an angle of about 45° to the horizontal. The furnace structure shown in Figs. 5 and 6 is provided with hollow metallic fluid cooled walls H and H' at the side of the furnace structure adjacent to the work carrier. As shown, the furnace BA is also provided with fluid cooled metallic walls HA and HA' at the outer and inner sides of each open end of the furnace chamber $B^{10}$. As shown, the furnace chamber $B^{10}$ is reduced in cross section at its ends to restrict gas flow into and out of the furnace chamber.

In Figs. 5 and 6, as the work pieces are moved from the loading station to the discharge station at which they are allowed to fall out of the notches onto a guide or chute structure EA, the work pieces are positively held in the work carrier notches D' by magnetic retaining elements L. As shown, there are two arc shaped magnetic retaining elements L alongside peripheral portions of the respectively adjacent dial members D of the work carrier. The element L may be a permanent magnet in some cases, but as shown herein each element L is an electro-magnet comprising an arc shaped body of suitable magnetic material which is surrounded by an energizing winding L'. The retainer body L is carried at the outer ends of supporting arms $L^2$ extending radially away from the axis of the shaft C and suitable anchored to the framework A. To prevent overheating of the retaining device L nearest the furnace, inner and outer arc shaped hollow cooling walls JB are interposed between the plane of the retainer device and the cooling walls H and H' which form a part of the furnace structure. Each electro-magnet L may well have one end adjacent and somewhat below the loading station and have its other end slightly above the level of the discharge end $BA^4$ of the furnace chamber.

Apparatus of the general type shown in Figs. 1 and 2, and 5 and 6 may be used for a variety of purposes, including in particular the heating of work piece ends to a forging temperature which, in the case of ferrous work pieces, may be about 2250° F., and the heating of ferrous and non-ferrous work pieces to lower temperatures for annealing and other purposes. Such apparatus is of a special utility in heating small work pieces of ferrous material to forging temperatures because of the uniformity of the heating operation and the rapidity with which it is effected. That rapidity contributes directly to a reduction in the amount of scale formed in the furnace. Furthermore, the bulk of such scale as is formed, is formed as the work pieces approach their final temperature after they have been gradually heated up to an intermediate temperature attained in the half or so of the furnace chamber adjacent its inlet end. In consequence, the bulk of the scale formed is free to separate from the work pieces by gravitational action and to fall down through the remaining portion of the furnace chamber which is but slightly inclined away from the vertical. Moreover, much of the scale adhering to the work pieces as they move below the discharge level, is dislodged and separated from the work pieces as the latter fall out of the work holders on to the discharge guide EA and roll down the latter.

In forging operations, the uniform heating of the work to the proper forging temperature, and the reduction of the scale on the work pieces to a minimum, are two elements of the operation contributing materially to the efficiency and low cost of the forging operation. A reduction in the amount of scale formed is practically important because it contributes to long die life and minimizes die repairs. A major cost item in the forging of small ferrous bodies is the cost of forging dies, and the cost of die repairs and replacements. Another substantial cost item is the scrap loss because forged products improperly heated are of inferior quality and must be treated as scrap. While apparatus of the character shown in Figs. 1, 2, 5 and 6 has especial advantages for use in heating ferrous work pieces to forging temperatures, it may be used with advantage for many other purposes and in particular it is well adapted for use in annealing ferrous and non-ferrous metallic bodies at temperatures which are substantially lower than forging temperatures and may be of the order of 1300° F.

The type of work carrier shown in Figs. 1 and 2 and 5 and 6, is well adapted for use in heat treating apparatus quite different in character from that shown in the figures last mentioned, and in Figs. 7 and 8 we have illustrated the use of such a carrier in hardening and annealing adjacent portions of elongated work pieces $da$. Each work piece $da$ comprises a body portion in the form of a straight piece of small diameter wire connecting short thicker end pieces $db$ and $dc$. Each of said end pieces is formed with an eyelet at one end and is butt welded at the other end to the adjacent end of the wire body portion. The particular work pieces shown are intended for use as links, each connecting the armature or core of an electromagnet to a device actuated in one way when the corresponding magnet is energized and in the opposite direction when the magnet is deenergized. For their intended use, it is practically important that the eyeletted ends of the portions $db$ and $dc$ be hardened and that the welded joint connecting each of the end portions to the wire body portion of the link be annealed to avoid the breaking tendency which would exist if the welded joint were left in a hardened condition.

As shown, the end portion $db$ of each work piece $da$ is first heated above its critical temperature, then quenched, and is thereafter reheated. The rotation of the work carrier moves the end portion $db$ successively through a heating zone in which the end portion $db$ is acted upon by the flame from a stationary hardening burner M, and immediately thereafter through a quenching zone where the portion $db$ is cooled by a jet of cooling liquid discharged through a stationary nozzle N immediately at the rear of the burner M, and thence through an annealing zone in which the end portion $db$ and the body portion of the part $da$ are subjected to the annealing action of a stationary burner O which is displaced toward the work carrier from the plane of the hardening burner M and quenching nozzle N. During the periods in which one end portion $db$ of a work piece $da$ is successively acted on by the burner M, quenching nozzle N and burner O, the other end portion $dc$ is similarly acted upon by a burner $m$, nozzle $n$ and burner $o$. The pipe sections to which the burners M and $m$, nozzles N and $n$, and burners O and $o$ are respectively connected, are shown as secured by corresponding clamping devices P to supporting rods Q parallel to the axis of the work carrier C and secured at their ends to end portions $A^5$ of the supporting framework of the apparatus. With the burners and quenching nozzles mounted as described, each burner and each nozzle can be separately adjusted circularly about the axis of the shaft C, and longitudinally of the latter as conditions make desirable.

As shown, a separate arc shaped work retaining element LA extends along the portion of the periphery of each dial DA from the top of the latter to the discharge level. The retaining members LA combine to prevent displacement of the work pieces $da$ as a result of the impact against them of the flame and cooling jets discharged by the burners M and O and the nozzle N, and as a result of the action of gravity as the path of movement of the work pieces approaches the vertical. The retaining devices LA are arranged to avoid interference with the gravitational discharge of the work pieces at the discharge level. The work pieces are thus free to drop out of the dial notches and on to the discharge chute or guide EB at the discharge level. The guide EB, as shown, has an upper end portion EB' shaped to cam the work pieces out of the dial notches in case they tend to remain in the seats as they move downward from the discharge level.

The heating burners M and $m$ and annealing burners O and $o$ may take various forms. In the preferred practical arrangement, each of said burners is of a well known commercial form comprising a combustion chamber into which flows a combustible mixture of air and gas in a multiplicity of fine streams and an outlet at its end adjacent the work which is elongated in the direction of the rotative movements of the work carrier and work pieces. To obtain a desirably rapid rate of heating the burners M, and in some cases the burners $n$ also, are preferably of the type disclosed in Hess Patent No. 2,367,119 of January 9, 1945, in which a combustion chamber pressure appreciably above the pressure of the atmosphere is maintained in normal operation.

The heat treatment of fragile work piece assemblies such as the magnet pull wires $da$ shown in Fig. 8, requires an accurate and careful regulated control of the heating and quenching operations to secure the desired hardening effect immediately adjacent the eyelet openings in the end pieces $db$ and $dc$, and the proper annealing of the welded joints by which said end pieces are connected to the ends of the wire body portion of the work piece. With each burner O displaced from the associated burner M angularly about the axis of the work carrier, as well as axially of the latter, and with the outlet of the burner O elongated in the direction of movement of the work piece as shown in Fig. 7, it has been found readily practical to so regulate the work heating effect of each burner O as to obtain the desired annealing action in the welded joint without annealing the portion of the work piece immediately surrounding the adjacent eyelet.

The control of the heating effect of the burners M and O may be highly accurate since the heating value of any of the usual commercially available fuel gases is closely controlled at the source of supply, and the burner heating effect is therefore substantially free from variations due to variations in the calorific power of the fuel gas. With commercially available fuel and air mixing apparatus, the ratio of the fuel gas to air in the mixture passed to the burners is subject to accurate control and may be varied as required to meet different operating conditions. Available burners of the type described have their combustion chamber inlet and outlet passages formed in accurately shaped bodies of ceramic material which do not suffer changes in shape or clog during extended periods of normal use. With work carriers of the kind disclosed, the speed of travel of the work pieces and the length of the periods in which they are subject to heating and cooling effects, may be accurately adapted to the conditions of use.

The particular forms of apparatus shown in Figs. 1 and 2 and Figs. 5 and 6 were devised and are adapted for use in heating one end only of an elongated work piece, as is required in many cases in which the purpose of the heating action is to prepare the work pieces for a forging operation or to anneal one end only of the work piece. In some cases, however, tubes, bars and other elongated work pieces require heating at each end, of the general character to which one end of each work piece is subjected in the apparatus shown in Figs. 1 and 2 and in Figs. 5 and 6. For such heating of each end of an elongated work piece, the apparatus shown in Figs. 1 and 2 or that shown in Figs. 5 and 6, may be modified by the addition of a second furnace. Thus, as shown in Fig. 9, the apparatus shown in Figs. 1 and 2 is adapted for use in simultaneously heating both ends of an elongated work piece $d$, by the addition of a second furnace BB. The latter may be identical with the furnace B of Figs. 1 and 2 except that its furnace chamber is arranged to receive the right-hand end of the work piece, as seen in Fig. 9. To adapt the apparatus shown in Fig. 9 for use in heating the two ends of elongated work pieces of different lengths, the two furnaces B and BB may be mounted on the framework A for relative adjustment toward and away from one another.

While in accordance with the provisions of the statutes, we have illustrated and described the best forms of embodiment of our invention now known to us, it will be apparent to those skilled in the art that changes may be made in the forms of the apparatus disclosed without departing from the spirit of our invention as set forth in the appended claims, and that in some cases, certain features of our invention may be used to advantage without a corresponding use of other features.

What is claimed is:

1. Heating apparatus comprising structure including a number of spaced apart rotatable members having a common axis of rotation and provided with substantially aligned recesses at the peripheries thereof for supporting and carrying elongated articles with the ends thereof projecting beyond said members to move said articles in succession from a loading station at one side of the vertical plane of the axis of rotation to an unloading station at the opposite side of such vertical plane and at which the articles are adapted to be discharged, means for driving said rotatable members in synchronism in a direction from the loading to the unloading station, stationary magnetic means extending adjacent to said articles as they move from said loading station to said unloading station to hold said articles in said recesses, and heating means having an arcuate chamber into which the ends of said articles extend as they are being moved by said members to apply heat directly to each of the elongated articles, while being carried from the loading to the unloading station, only at portions thereof which are out of physical contact with the rotatable members.

2. Heating apparatus comprising structure including a number of spaced apart rotatable members having a common axis of rotation provided with substantially aligned recesses at the peripheries thereof for supporting and carrying elongated articles with the ends thereof projecting beyond said members to move said articles in succession from a loading station at one side of the vertical plane of the axis of rotation to an unloading station at the opposite side of such vertical plane and at which the articles are adapted to be discharged, magnetic means including spaced apart curved elements mounted adjacent to the articles in said recesses to attract and hold the articles in the recesses during movement thereof from the loading to the unloading station, means for driving said rotatable members in synchronism in a direction from the loading to the unloading station, and heating means having a chamber into which the ends of the articles project as they are being moved by said members to apply heat directly to each of the elongated articles, while being carried from the loading to the unloading station, only at portions thereof which are out of physical contact with the rotatable members.

3. Heating apparatus comprising structure including a number of spaced apart rotatable members having a common axis of rotation and provided with substantially aligned recesses at the peripheries thereof for supporting and carrying elongated articles with the ends thereof projecting beyond said members to move said articles in succession from a loading station at one side of the vertical plane of the axis of rotation to a region at the opposite side of such vertical plane at which the articles are adapted to be discharged, stationary magnetic means including spaced apart curved elements arranged to attract and hold the articles in the recesses during movement thereof from the loading to the unloading station, the outer peripheral surfaces of the elements extending between said loading and unloading stations and being adjacent to the inner surfaces of the articles when the latter are held in the recesses, means for driving said rotatable members in synchronism in a direction from the loading to the unloading station, and heating means having a chamber into which the ends of the articles project as they are being moved by said members to apply heat directly to each of the elongated articles, while being carried from the loading to the unloading station, only at portions threeof which are out of physical contact with the rotatable members.

4. Heat treating apparatus comprising structure including spaced apart rotatable members having a common axis of rotation and being provided at their peripheries with means for carrying elongated articles with the ends thereof projecting beyond said members, means to rotate said members in a direction to move articles carried thereby from a loading station through a heating station to an unloading station, means to hold said articles in said carrying means from the loading to the unloading station including magnetic means arranged within the periphery of said members and exerting force to hold said articles against the carrier means on the peripheries of said members, and heating means having a chamber into which the ends of the articles project as they are being moved by said members to apply heat directly to the projecting ends of the elongated articles as they move through the heating station only at portions thereof which are out of physical contact with said members.

5. In a heat treating machine, the combination of a horizontally extending rotatable shaft, a pair of disc shaped members on said shaft, each member being provided with aligned receiving means on its periphery operative to receive elongated work pieces to be heat treated with the ends thereof extending beyond said members, means to rotate said shaft to thereby carry workpieces on said receiving means from a loading station to an unloading station and past a heating station, means extending around said members from said loading station to said unloading station to hold the work pieces in said receiving means, said heating station including furnace structure extending in an arc around a portion of the distance between said loading and unloading stations, a furnace chamber in said structure, an arc shaped slot extending from the exterior of said structure to the chamber thereof and through which the ends of elongated workpieces may extend into said chamber to be heated as they are moved, and an opening in each end of said structure communicating with said chamber and forming a continuation of said slot through which the ends of said workpieces may move into and leave said chamber.

6. The combination of claim 5 including water cooled walls extending along both sides of said slot to protect said carrier from the heat and to protect all of the blank except the part extending into said chamber from the heat whereby only a portion of the blank will be heated.

FREDERIC O. HESS.
FRED MAUD.

REFERENCES CITED

The following references are of record in the file of this patent:

UNITED STATES PATENTS

| Number | Name | Date |
| --- | --- | --- |
| 669,264 | Norton et al. | Mar. 5, 1901 |
| 821,752 | Shaw | May 29, 1906 |
| 1,149,917 | Jamison et al. | Aug. 10, 1915 |
| 1,252,561 | Fassinger | Jan. 8, 1918 |
| 1,605,535 | Foisy | Nov. 2, 1926 |
| 1,733,403 | Cushing | Oct. 29, 1929 |
| 1,868,954 | Sorrel et al. | July 26, 1932 |
| 2,009,856 | Otis et al. | July 30, 1935 |
| 2,182,294 | Kuhnle | Dec. 5, 1939 |
| 2,215,080 | Hess | Sept. 17, 1940 |
| 2,317,161 | Felber | Mar. 13, 1945 |
| 2,504,685 | Hess et al. | Apr. 18, 1950 |

FOREIGN PATENTS

| Number | Country | Date |
| --- | --- | --- |
| 272,849 | Germany | Apr. 16, 1914 |